United States Patent
Viswanathan et al.

(10) Patent No.: US 9,785,430 B2
(45) Date of Patent: Oct. 10, 2017

(54) METHODS, SYSTEMS AND COMPUTER-READABLE MEDIA FOR DETECTING A PARTIAL COMMIT

(71) Applicant: Infosys Limited, Bangalore (IN)

(72) Inventors: Sree Aurovindh Viswanathan, Tiruppur District (IN); Girish Maskeri Rama, Bangalore (IN)

(73) Assignee: Infosys Limited, Bangalore (IN)

( * ) Notice: Subject to any disclaimer, the term of this patent is extended or adjusted under 35 U.S.C. 154(b) by 0 days.

(21) Appl. No.: 14/198,878

(22) Filed: Mar. 6, 2014

(65) Prior Publication Data
US 2014/0289704 A1 Sep. 25, 2014

(30) Foreign Application Priority Data
Mar. 21, 2013 (IN) .......................... 1239/CHE/2013

(51) Int. Cl.
G06F 9/44 (2006.01)
G06F 9/445 (2006.01)

(52) U.S. Cl.
CPC .................. *G06F 8/71* (2013.01); *G06F 8/65* (2013.01); *G06F 8/72* (2013.01)

(58) Field of Classification Search
CPC ..... G06F 8/71; G06F 8/73; G06F 8/74; G06F 8/714
USPC ........................................................ 717/101
See application file for complete search history.

(56) References Cited

U.S. PATENT DOCUMENTS

| 7,716,649 | B2 | 5/2010 | Clemm et al. |
| 8,380,681 | B2 * | 2/2013 | Oltean .............. G06F 17/30091 707/692 |
| 2004/0255298 | A1 * | 12/2004 | Dorrance et al. ............ 718/101 |
| 2006/0010425 | A1 | 1/2006 | Willadsen et al. |
| 2007/0143744 | A1 | 6/2007 | Clemm et al. |
| 2008/0263538 | A1 * | 10/2008 | Bando ....................... G06F 8/65 717/171 |
| 2010/0050156 | A1 * | 2/2010 | Bonanno ................ G06F 8/443 717/122 |
| 2011/0035726 | A1 | 2/2011 | Davies et al. |

(Continued)

OTHER PUBLICATIONS

"Adrian et al"; "The Missing Links: Bugs and Bug-fix Commits";"Jul. 11, 2010";"10 Pages".*
(Continued)

*Primary Examiner* — Wei Zhen
*Assistant Examiner* — Brahim Bourzik
(74) *Attorney, Agent, or Firm* — LeClairRyan, a Professional Corporation

(57) ABSTRACT

The present invention provides a method and system for detecting a partial commit of software. A dependency information of the software is extracted from a version history and a bug database. A dimensional matrix containing a set of commit, and relationship information with a set of files with each commit is created from the dependency information. A centrality matrix is computed by performing a first set of matrix transformations on the dimensional matrix. A set of missing files of a partial commit, is identified by performing a second set of matrix transformations on the centrality matrix and a file vector, the file vector including a file dependency information of the partial commit.

21 Claims, 5 Drawing Sheets

(56) References Cited

U.S. PATENT DOCUMENTS

2011/0078516 A1* 3/2011 El-Kersh ................ G06F 9/466
                                                      714/48
2011/0099206 A1* 4/2011 Donovan ................... 707/802
2014/0149435 A1* 5/2014 Sisman ............... G06F 11/362
                                                      707/751

OTHER PUBLICATIONS

"Baker et al";"Singular Value Decomposition Tutorial";"Mar. 29, 2005";"24 pages".*
Das et al., Finding Dependencies from Defect History, 23 pp. (2009).
de Souza et al., "Management of Interdependencies in Collaborative Software Development," Empirical Software Engineering. ISESE, International Symposium, 11 pp. (2003).

* cited by examiner

METHODS, SYSTEMS AND COMPUTER-READABLE MEDIA FOR DETECTING A PARTIAL COMMIT

CROSS-REFERENCE TO RELATED APPLICATIONS

This application claims the benefit of Indian Patent Application Filing No. 1239/CHE/2013, filed Mar. 21, 2013, which is hereby incorporated by reference in its entirety.

FIELD OF THE INVENTION

The present invention relates generally to a method and system for determining intricate dependencies between files of software. More specifically, the present invention relates to a method and system for detecting missing files in a partial commit.

BACKGROUND OF THE INVENTION

Existing software systems are usually spread across a discrete set of files involving intricate dependencies. A change made to a software system, also known as a commit, tends to miss out a partial subset of files, containing such intricate dependencies. Such a commit that misses out the partial subset of files is usually referred to as a partial commit. Present technologies provide a myriad of techniques for determining the partial commit.

Impact analysis tools conduct static analysis of a software system, to determine the various parts of the software system that maybe affected when a commit is made to the software system. A mapping between requirement, design elements and connections between logical code segments is provided for tracking all structural dependencies. Further, source code of the system is analyzed for determining structural dependencies. However, dependency information present within configuration files or machine-readable files of software components may be limited, as static information within configuration files may not provide information of dynamic, run-time dependencies.

Thus, certain dynamic analysis tools are available for evaluating a software system's behavior based on real time data. However, dynamic analysis tools are usually customized to a particular programming language and hence fail to operate on software systems built on a variety of languages. As a result, a change incorporated into a particular functionality of the software would interfere with various parts of the software system under consideration. A possibility of missing out a set of files unmodified always exists, thereby resulting in more effort during a testing phase of the software system. Hence the existing systems and methods are inefficient in calculating implicit dependencies in software systems.

Hence there is a need for an alternative method and a system that can mine a history of the software system for uncovering all implicit file dependencies for a change made to the software system. The alternative method must customize itself to the software system's architectural implementation and language. Thus a method for detecting a partial commit is proposed.

The present invention is directed to overcoming these and other deficiencies in the art.

SUMMARY OF THE INVENTION

The present invention provides a method and system for detecting a partial commit of software. In accordance with a disclosed embodiment, the method may include extracting dependency information from a version history, and a bug database of the software, creating a dimensional matrix from the extracted dependency information, whereby the dimensional matrix contains a set of commits and a set of files occurring in each commit. A centrality matrix is computed from the dimensional matrix by a first set of matrix transformations. A second set of matrix transformations is performed on the centrality matrix and a file vector, whereby the file vector includes file dependency information of the partial commit. A weighted vector being a resultant of the second set of matrix transformations is evaluated for a set of missing files of the partial commit.

In an additional embodiment, a system for detecting a partial commit of a software is disclosed. The system comprises a commit file extractor, configured to extract dependency information from a version repository and a bug database of the software. A knowledge database, is configured to update the dependency information into a dimensional matrix. A decomposition module is configured to obtain a centrality matrix from the dimensional matrix, and a commit information extractor is configured to obtain a file dependency information of the partial commit. A commit analyzer, is configured to obtain a set of missing files, of the partial commit by a performing a matrix transformation on the file dependency information and the centrality matrix.

These and other features, aspects, and advantages of the present invention will be better understood with reference to the following description and claims.

While systems and methods are described herein by way of example and embodiments, those skilled in the art recognize that systems and methods for electronic financial transfers are not limited to the embodiments or drawings described. It should be understood that the drawings and description are not intended to be limiting to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include", "including", and "includes" mean including, but not limited to.

DETAILED DESCRIPTION OF THE INVENTION

Disclosed embodiments provide computer-implemented methods, systems, and computer-program products for recommending an optimal shopping path to a user. The methods disclosed herein, incorporate dynamic programming for calculating an optimal shopping path in a shopping mall. The optimal shopping path is usually a shortest path among a plurality of item nodes in the shopping mall, where the plurality of item nodes represents a plurality of shopping items intended to be purchased by the user.

Figure 1:
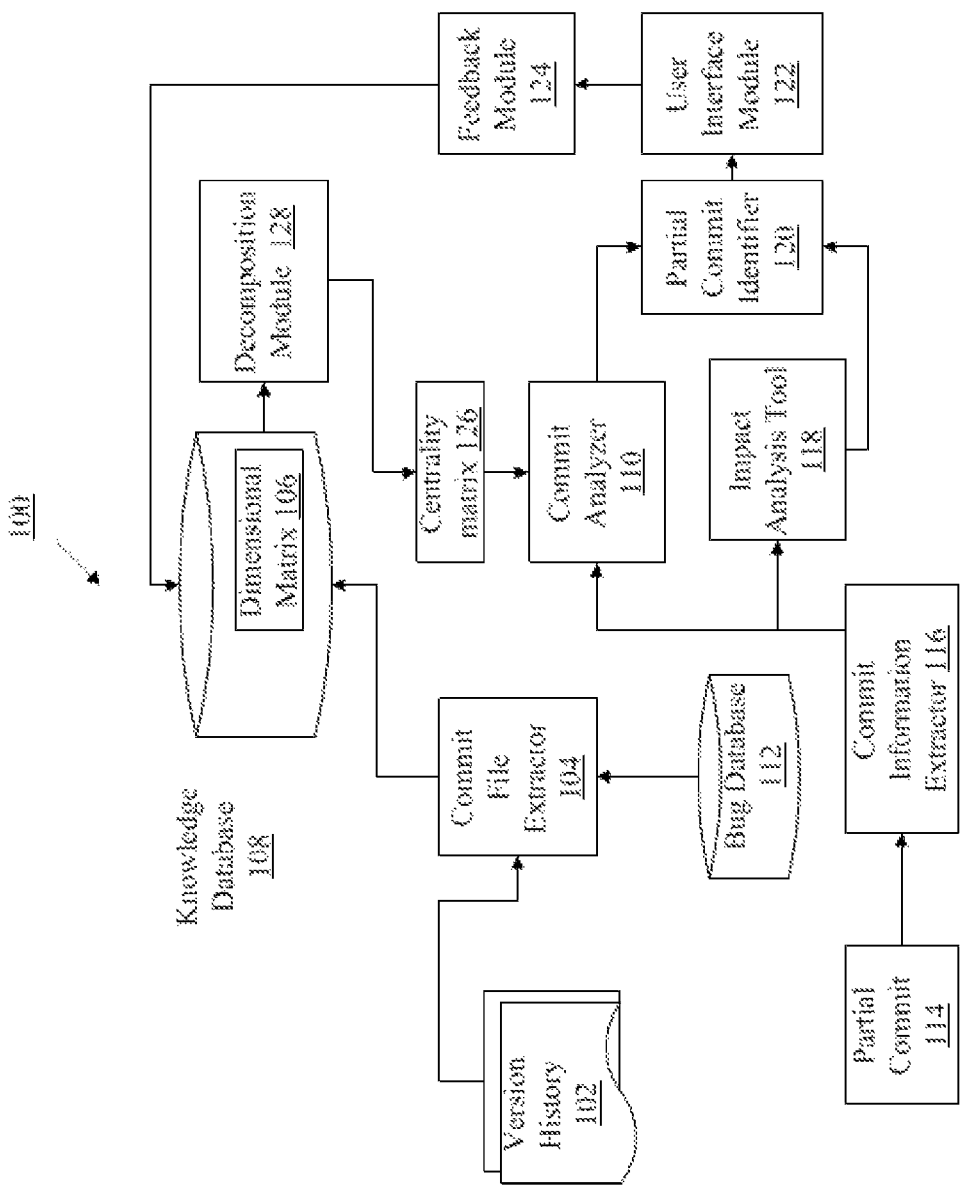
FIG. 1 shows an exemplary system for detecting a partial commit of a software.

FIG. 1 illustrates an exemplary system 100 in which various embodiments of the invention can be practiced. The exemplary system 100 includes a commit file extractor 104, a version history 102, a bug database 112, a commit analyzer 110, a knowledge database 108, an impact analysis tool 118, a commit information extractor 116, a partial commit identifier 120, a user interface module 122, a feedback module 124, and a decomposition module 128.

The commit file extractor 104, can be modeled to extract dependency information of a software system under consideration, from the version history 102, and the bug database 112, of the system. The version history 102, usually contain an entire list of update and modification transactions which provide relevant information on how a change is made historically to the software system under consideration. The bug database 112 shall provide a set of bugs introduced into the system and a fix information of the set of bugs, where the fix information shall contain information of how a bug is fixed. The commit file extractor 104, shall extract a source information of a bug present in the software from the bug database 112 and extract a set of missing dependency files from the version history 102. The dependency information can include a list of transactions performed on the software, a set of bugs in the software and a set of fix information available for the set of bugs. The dependency information is usually represented in a form of a dimensional matrix 106. The dimensional matrix 106 usually represents a relationship between a set of files present in a transaction and a set of commits, where each commit represents a transaction. For instance if matrix 'A' is a m*n dimensional matrix 106, the occurrence of a file in the commit can be denoted by a predefined value. In the given instance, in the matrix 'A', Aij=1, if $j^{th}$ file is present in the $i^{th}$ commit, and Aij=0 if $j^{th}$ file is not present in the $i^{th}$ commit, where Aij represents an element of matrix 'A'.

The decomposition module 128, can be configured to obtain a centrality matrix 126 from the dimensional matrix 106, using a singular vector decomposition (SVD) method. The singular matrix decomposition for the dimensional matrix 106, can be given by $$A=UDV'$$

Where, A is the m*n dimensional matrix 106,
U is a m*k matrix of left singular vectors,
D is the diagonal vector of the form k*k matrix, and
V is the n*k matrix of right singular vectors. The matrix V is referred as the centrality matrix 126. The matrices A, U, D, and V are stored within the knowledge database 108, for further processing. A total number of files that need to be taken into consideration is usually determined by a value of 'k'. The SVD method being a computationally expensive process can be made effective by appropriately choosing a value of 'k'.

When a partial commit 114, is introduced into the system 100, a file dependency information of the partial commit 114, is extracted by the commit information extractor 116. The file dependency information can include an author of the partial commit 114, a set of files committed and information on a type of modification implemented by the partial commit 114. The file dependency information is converted into a vector format, $t_{cap}$, by the commit information extractor 116, and is fed to the commit analyzer 110. The commit analyzer 110, further obtains the centrality matrix 126, from the decomposition module 128, and performs a matrix transformation process on the file dependency information of the partial commit 114. In order to obtain a set of missing files of the partial commit 114, the matrix transformation process performed can be expressed as follows:

$$t_{eval}=t_{cap}*V*V',$$

where V is the centrality matrix 126,

V' is the transpose of the centrality matrix 126, $t_{cap}$ is the partial commit 114 expressed in a vector form, and $t_{eval}$ is a weighted vector denoting a probability of occurrence of a file in the partial commit 114.

The impact analysis tool 118, any standard impact analysis tool available in prior art, shall be deployed for detecting a set of plausible files of the partial commit 114. The impact analysis tool 118 shall rank the set of plausible files according to a probability of occurrence of a file in the partial commit 114. The partial commit identifier 120, can be configured to compile a list of files of the partial commit 114 from the set of missing files and the set of plausible files. Weights of the set of plausible files obtained from the impact analysis and weights of the files denoted in t are compared and an estimate vector as $t_{estimate}$ is obtained. A file of $t_{estimate}$ is identified as a missing file of the partial commit 114, if the weight of the file exceeds a predetermined threshold. The predetermined threshold varies with respect to a technical implementation and a software architecture of the system 100. As the system 100 undergoes a plurality of changes, the threshold shall adjust itself such as to provide an optimum set of missing files for the partial commit 114. The user interface module 122, can be configured to display a list of files identified as missing files to a user of the system 100. A feedback module 124, shall be configured to receive a feedback from the user on the identified missing files. Based on the feedback from the user, the partial commit 114 is committed to the system and the knowledge database 108 is updated.

Figure 2:
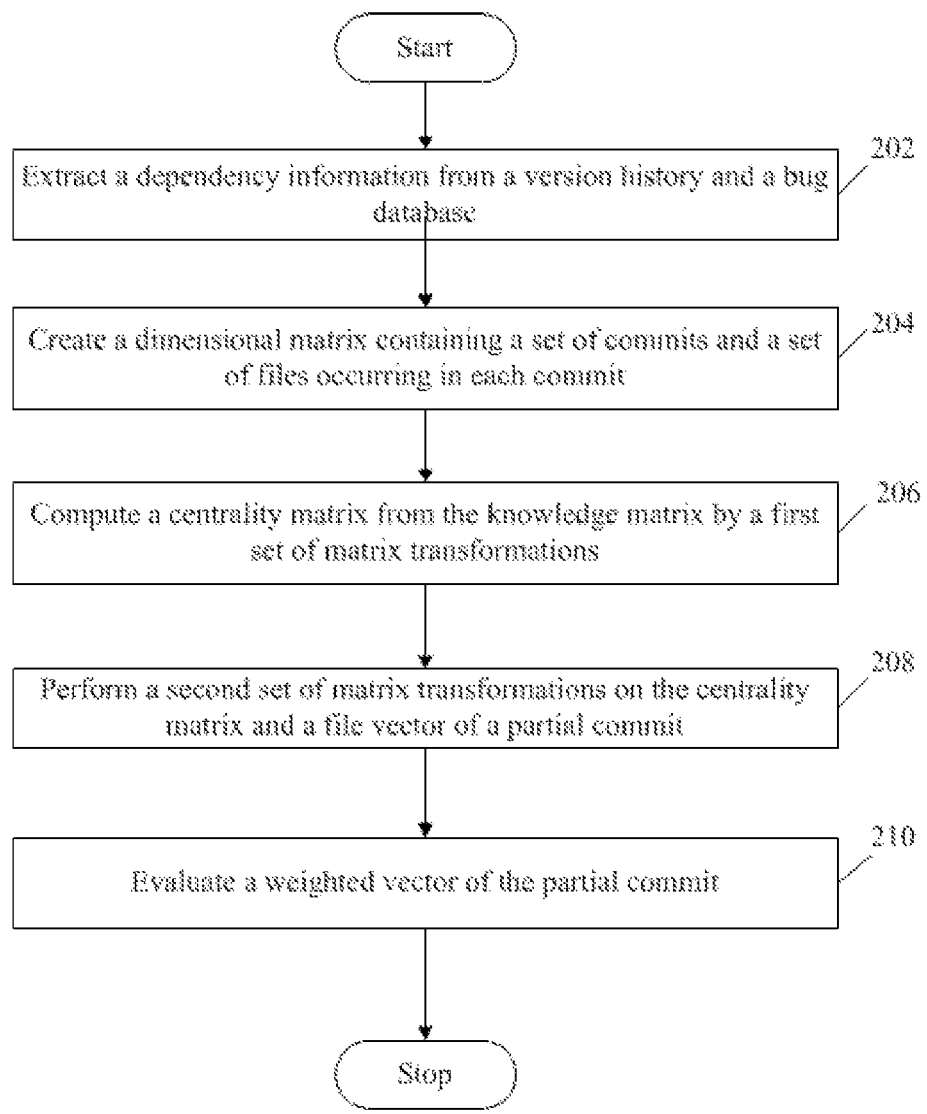
FIG. 2 is a flowchart illustrating an embodiment of a method of detecting a partial commit of a software.

FIG. 2 is a flowchart that illustrates a method performed in detecting a partial commit of a software in an embodiment of the invention. At step 202, dependency information is extracted from a version history and a bug database of the software. A dimensional matrix can be created from the extracted dependency information at step 204. The dimensional matrix usually consists of a set of commits and relationship information of each commit with a set of files. The relationship information includes an occurrence of a file in the commit. Further, at step 206, a centrality matrix is computed from the knowledge matrix through a first set of matrix transformations. In the disclosed embodiment, the first set of matrix transformations can include a singular vector decomposition method (SVD). The SVD of the knowledge matrix can be given by:

$$A=UDV', \text{ where}$$

A is the knowledge matrix of an order m*n,
U is a m*k matrix of left singular vectors,
D is a diagonal vector of an order k*k, and
V is a n*k matrix of right singular vectors also referred to as the centrality matrix.

When a partial commit, is received by the system, a file dependency information of the partial commit is represented in a form of a file vector. At step 208, a second set of matrix transformations is performed on the centrality matrix and the file vector, $t_{cap}$, for determining a set of missing files of the partial commit. In the disclosed embodiment, the second set of matrix transformations can include an equation such as:

$$t_{eval}=t_{cap}*V*V'$$

where, V is the centrality matrix,

V' is the transpose of the centrality matrix, $t_{cap}$ is the file vector of the partial commit, and $t_{eval}$ is a weighted vector denoting a probability of occurrence of a file in the partial commit.

The weighted vector $t_{eval}$, shall be evaluated for determining a set of missing files of the partial commit at step 210. For the purpose of evaluation of the weighted vector $t_{eval}$, weight of a missing file of the weighted vector $t_{eval}$, is compared with a predetermined threshold. In an event the weight of the file as evaluated, exceeds the predetermined threshold, the file shall be indicated as a missing file of the partial commit.

Figure 3A:
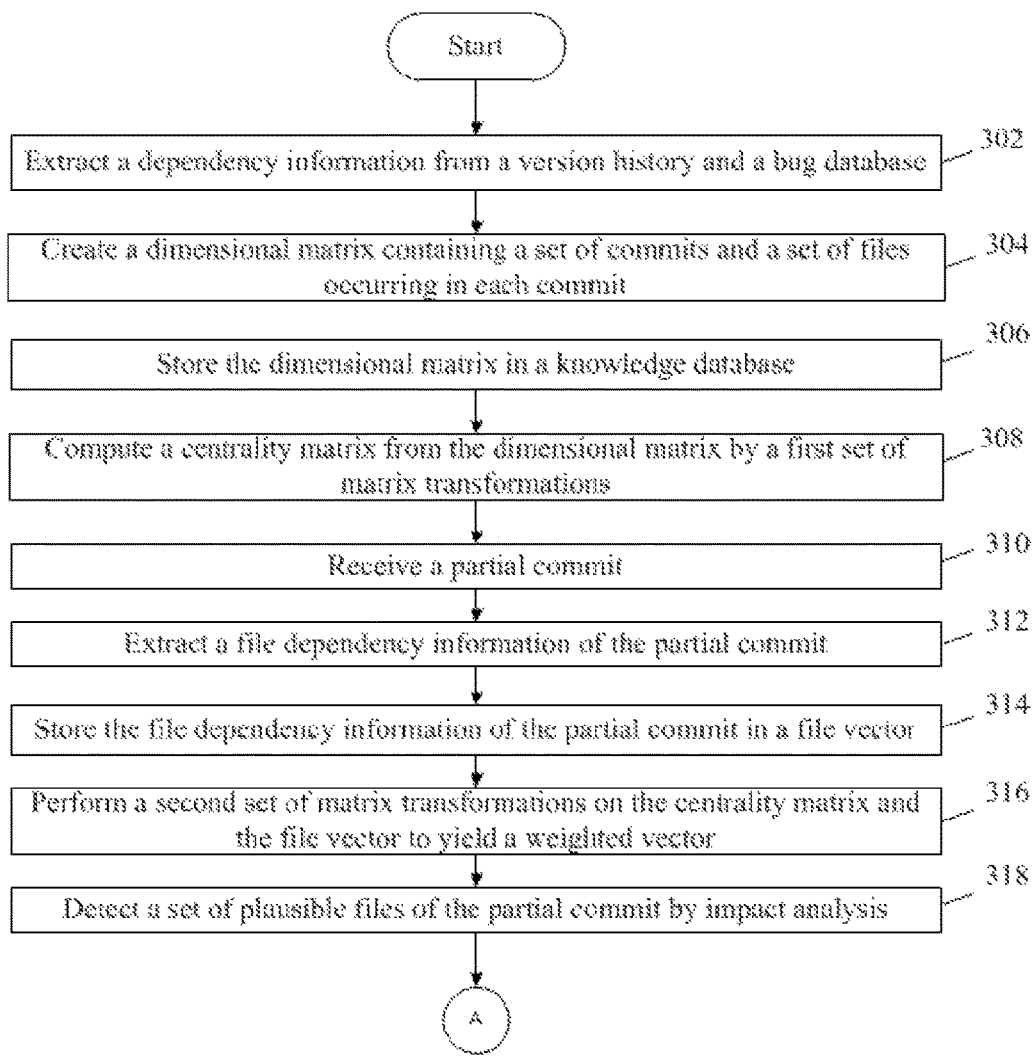
FIG. 3a and FIG. 3b is a flowchart illustrating a preferred embodiment of a method detecting a partial commit of a software.
Figure 3B:
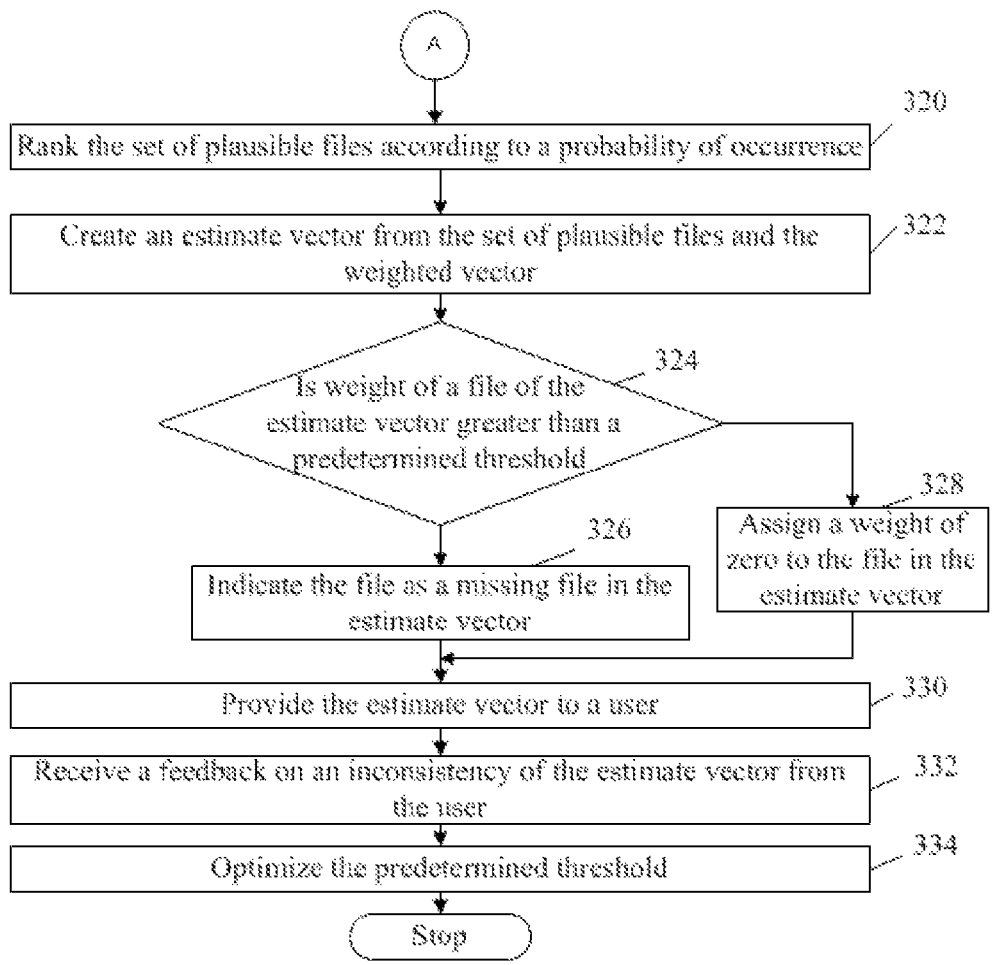

FIGS. 3a and 3b illustrates an alternate embodiment of a method of practicing the instant invention. At step 302 dependency information of a software system under consideration, can be extracted from a version history and a bug database of the software system. The version history, usually contains an entire list of update and modification transactions which provide relevant information on how a change is made historically to the software system under consideration. The bug database shall provide a set of bugs introduced into the system and a fix information of the set of bugs, where the fix information shall contain information of how a bug is fixed. Further a dimensional matrix comprising a set of commits that may occur in the system, and a set of files occurring in each commit, can be created at step 304. At step 306, the dimensional matrix shall be stored in a knowledge database. Using a first set of matrix transformations such as singular vector decomposition (SVD) on the dimensional matrix a centrality matrix can be computed at step 308. At step 310, when a partial commit is received by the software system, a file dependency information of the partial commit is extracted at step 312. The file dependency information of the partial commit can be stored in a file vector form at step 314. A second set of matrix transformations may be performed on the centrality matrix at step 316, to yield a weighted vector. In the alternate embodiment, the second set of matrix transformations can include a multiplication of the file vector with the centrality matrix and a transpose of the centrality matrix. At step 318, a set of plausible files that could be missing in the partial commit can be analyzed by an impact analysis method. The set of plausible files can be ranked in accordance to a probability of occurrence of a file in the partial commit at step 320. The set of plausible files and the weighted vector are combined to form an estimate vector at step 322. In an event a weight of a file in the estimate vector is greater than a predetermined threshold; the file is indicated as a missing file in the estimate vector. In an event the weight of the file is less than the predetermined threshold, the file is discarded from the partial commit. The indicated files of the estimate vector are provided to a user of the software system, as missing files of the partial commit, at step 330. Further, at step 332, a feedback on an inconsistency of the estimate vector is received from the user. The feedback may include an input such as a file not being a missing file of the partial commit. Finally, at step 334, based on the feedback, the predetermined threshold maybe optimized in order to minimize the inconsistency of the estimate vector.

In the disclosed embodiment, considering the SVD being used as the first set of matrix transformations for determining the partial commit. Consider an instance where the dimensional matrix A as a 10*10 matrix having 10 files, f1, f2, f3, . . . f10. Assume that 10 modification commits are present in the system. In a modification commit, a subset of file is modified. The dimensional matrix, 'A' may be represented in the matrix form are shown below:

| | f1 | f2 | f3 | f4 | f5 | f6 | f7 | f8 | f9 | f10 |
|---|---|---|---|---|---|---|---|---|---|---|
| Commit 1 | 0 | 0 | 0 | 0 | 1 | 1 | 1 | 1 | 0 | 1 |
| Commit 2 | 1 | 0 | 0 | 1 | 0 | 1 | 0 | 0 | 1 | 1 |
| Commit 3 | 0 | 1 | 0 | 0 | 0 | 1 | 0 | 0 | 0 | 0 |
| Commit 4 | 1 | 1 | 1 | 0 | 0 | 0 | 1 | 0 | 1 | 0 |
| Commit 5 | 0 | 1 | 0 | 1 | 1 | 0 | 0 | 1 | 1 | 1 |
| Commit 6 | 1 | 0 | 1 | 0 | 0 | 1 | 1 | 1 | 1 | 0 |
| Commit 7 | 0 | 0 | 0 | 1 | 0 | 0 | 1 | 1 | 0 | 0 |
| Commit 8 | 0 | 0 | 0 | 1 | 1 | 1 | 0 | 1 | 0 | 0 |
| Commit 9 | 0 | 1 | 0 | 0 | 1 | 1 | 1 | 1 | 1 | 0 |
| Commit 10 | 0 | 0 | 1 | 0 | 0 | 0 | 1 | 1 | 1 | 0 |

In the dimensional matrix, a first row indicates a first commit, Commit 1, wherein files f5, f6, f7, f8 and f10 are modified, but rest of the files were untouched. Similarly row 3 indicates, that in Commit 3, files f2 and f6 are modified. The version history of the software system and the bug history are mined to extract the dependency information, as represented in the dimensional matrix. A total number of commits made to the system and the files present in each commit comprise the extracted dependency information. On representing the dependency information in the dimensional matrix, the Singular Vector Decomposition (SVD) may be performed on the matrix as follows:

$$A = UDV',$$

Assuming k equals 5, U, V and D may be decomposed as $$U = \begin{bmatrix} 0.3442 & 0.2909 & 0.2840 & 0.0653 & -0.3163 \\ 0.2822 & 0.0782 & -0.7236 & 0.4243 & -0.1348 \\ 0.1232 & 0.0686 & -0.1788 & -0.4323 & -0.3875 \\ 0.2907 & -0.5503 & -0.2260 & -0.2552 & 0.1472 \\ 0.3672 & 0.3429 & -0.2592 & -0.2289 & 0.6435 \\ 0.4102 & -0.3917 & 0.0473 & 0.2925 & -0.3158 \\ 0.2188 & 0.0833 & 0.3088 & 0.3518 & 0.3015 \\ 0.2703 & 0.4452 & 0.0995 & 0.1832 & -0.1342 \\ 0.4363 & 0.0657 & 0.1823 & -0.4994 & -0.1409 \\ 0.2964 & -0.3482 & 0.3236 & 0.1377 & 0.2595 \end{bmatrix}$$

$$V = \begin{bmatrix} 0.1965 & -0.3253 & -0.4345 & 0.2581 & -0.1748 \\ 0.2433 & -0.0275 & -0.2319 & -0.7918 & 0.0511 \\ 0.1993 & -0.4858 & 0.0698 & 0.0978 & 0.0523 \\ 0.2275 & 0.3576 & -0.2767 & 0.4084 & 0.3895 \\ 0.2834 & 0.4311 & 0.1476 & -0.2684 & 0.0300 \\ 0.3730 & 0.2097 & -01393 & 0.0187 & -0.8237 \\ 0.3990 & -0.3202 & 0.4430 & 0.0517 & -0.0374 \\ 0.4683 & 0.1838 & 0.4749 & 0.1689 & 0.1712 \\ 0.4163 & -0.3025 & -0.3157 & -00722 & 0.2643 \\ 0.1986 & 0.2681 & -0.3365 & 0.1457 & 0.1109 \end{bmatrix}$$

$$D = \begin{matrix} 5.0037 & 0 & 0 & 0 & 0 \\ 0 & 2.6556 & 0 & 0 & 0 \\ 0 & 0 & 2.0767 & 0 & 0 \\ 0 & 0 & 0 & 1.7882 & 0 \\ 0 & 0 & 0 & 0 & 1.7356 \end{matrix}$$

The above matrices U, V and D are stored in a knowledge database of the system for suggesting missing files of a partial commit introduced into the system. In the given instance, the partial commit $t_{cap}$: [1 1 1 0 0 0 0 0 0 0], introduced into the system modifies files f1, f2 and f3. In order to check if the developer has missed out making a change to a related file, following matrix transformations can be performed for recommending such related file;

$$t_{eval} = t_{cap} * V * V'$$

$t_{eval}$=[0.5401 0.6664 0.4520 −0.1563 −0.1506 0.1139 0.2355 −0.2070 0.7471 0.0425 ]

As can be observed, resulting vector $t_{eval}$ comprises of 10 columns, each column representing a file of the partial commit. A value of each column, represents a probability of occurrence of a file in the partial commit. As columns 4,5 and 8 have negative values, it is unlikely that files 4,5 and 8 can be present in the partial commit. Of the rest of the files, that are indicated by a positive number, a predetermined threshold can be set to determine which file is likely to be present in the partial commit. In the given instance, if the predetermined threshold, is set to a value of 0.2, then columns 1,2,3,7 and 9 would be considered most likely as a part of the commit, as they have values greater than 0.2. As $t_{cap\ includes}$ files 1,2 and 3, only files 7 and 9 are suggested to the user as potentially missing files from the partial commit. It can be pertinent to observe, the partial commit is identical to one of the past commit history such as commit 4.

Figure 4:
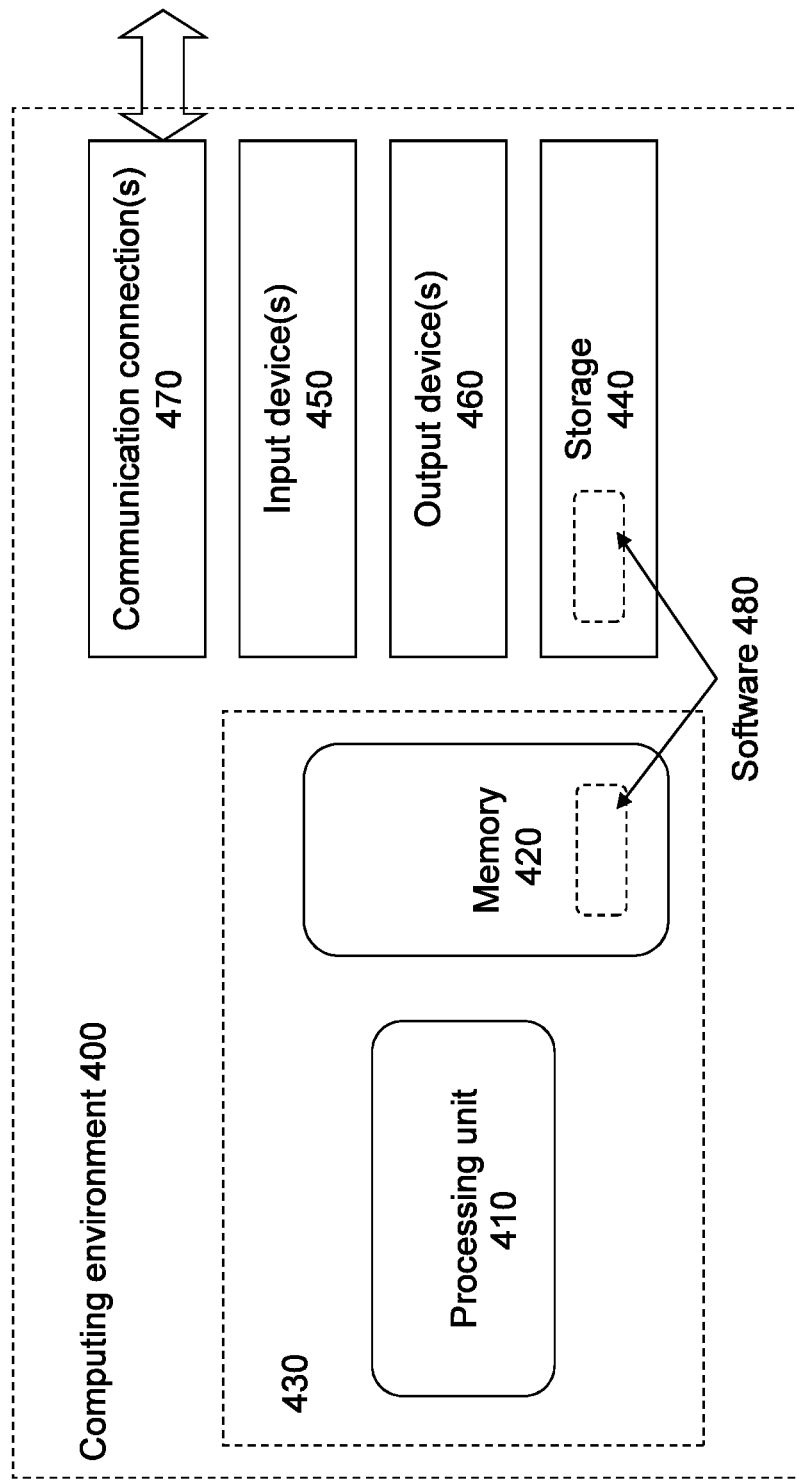
FIG. 4 illustrates a generalized example of a computing environment 400.

One or more of the above-described techniques can be implemented in or involve one or more computer systems. FIG. 4 illustrates a generalized example of a computing environment 500. The computing environment 500 is not intended to suggest any limitation as to scope of use or functionality of described embodiments.

With reference to FIG. 4, the computing environment 400 includes at least one processing unit 410 and memory 420. In FIG. 4, this most basic configuration 430 is included within a dashed line. The processing unit 410 executes computer-executable instructions and may be a real or a virtual processor. In a multi-processing system, multiple processing units execute computer-executable instructions to increase processing power. The memory 420 may be volatile memory (e.g., registers, cache, RAM), non-volatile memory (e.g., ROM, EEPROM, flash memory, etc.), or some combination of the two. In some embodiments, the memory 420 stores software 480 implementing described techniques.

A computing environment may have additional features. For example, the computing environment 400 includes storage 440, one or more input devices 440, one or more output devices 460, and one or more communication connections 470. An interconnection mechanism (not shown) such as a bus, controller, or network interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other medium which can be used to store information and which can be accessed within the computing environment 400. In some embodiments, the storage 440 stores instructions for the software 480.

The input device(s) 450 may be a touch input device such as a keyboard, mouse, pen, trackball, touch screen, or game controller, a voice input device, a scanning device, a digital camera, or another device that provides input to the computing environment 400. The output device(s) 460 may be a display, printer, speaker, or another device that provides output from the computing environment 400.

The communication connection(s) 470 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations can be described in the general context of computer-readable media. Computer-readable media are any available media that can be accessed within a computing environment. By way of example, and not limitation, within the computing environment 400, computer-readable media include memory 420, storage 440, communication media, and combinations of any of the above.

Having described and illustrated the principles of our invention with reference to described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

As will be appreciated by those ordinary skilled in the art, the foregoing example, demonstrations, and method steps may be implemented by suitable code on a processor base system, such as general purpose or special purpose computer. It should also be noted that different implementations of the present technique may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory.

The following description is presented to enable a person of ordinary skill in the art to make and use the invention and is provided in the context of the requirement for a obtaining a patent. The present description is the best presently-contemplated method for carrying out the present invention. Various modifications to the preferred embodiment will be readily apparent to those skilled in the art and the generic principles of the present invention may be applied to other embodiments, and some features of the present invention may be used without the corresponding use of other features. Accordingly, the present invention is not intended to be limited to the embodiment shown but is to be accorded the widest scope consistent with the principles and features described herein.

While the foregoing has described certain embodiments and the best mode of practicing the invention, it is understood that various implementations, modifications and examples of the subject matter disclosed herein may be made. It is intended by the following claims to cover the various implementations, modifications, and variations that may fall within the scope of the subject matter described.

What is claimed:

1. A software version analysis device comprising a memory having programmed instructions stored thereon and at least one processor coupled to the memory and configured to execute the stored programmed instructions to:
   extract historical dependency information from a version repository and a bug database for a software application;
   generate a dimensional matrix based on the historical dependency information, wherein the dimensional matrix comprises at least an indication of a set of commits and an indication of a set of files included in each of the commits;
   generate a centrality matrix from the dimensional matrix based on one or more matrix transformations performed on the dimensional matrix;
   obtain file dependency information of a received another commit associated with the software application, the another commit identifying a plurality of files to be committed;
   determine when the another commit is a partial commit having one or more missing files, which were not included in the plurality of files to be committed, based on one or more matrix transformations performed using the file dependency information and the centrality matrix; and
   determine a set of plausible files for the another commit, generate a ranking of the set of plausible files according to a probability of occurrence in the another commit, determine the missing files based on the ranking or a predetermined threshold, and update a knowledge database or the predetermined threshold, when the determining indicates that the another commit is a partial commit.

2. The software version analysis device of claim 1, wherein the dependency information comprises one or more of an indication of one or more transactions performed on the software application, a set of bugs in the software application, or fix information available for the set of bugs.

3. The software version analysis device of claim 1, wherein the centrality matrix is a right singular matrix and the one or more matrix transformations comprises a singular vector decomposition of the dimensional matrix.

4. The software version analysis device of claim 1, wherein the file dependency information comprises a vector comprising one or more of an author of the commit, a set of committed files, or a type of modification.

5. The software version analysis device of claim 1, wherein the missing files are represented as a weighted vector, wherein a weight of each of the missing files in the weighted vector indicates a probability that the missing file should have been included in the plurality of files to be committed of the another commit.

6. The software version analysis device of claim 1, wherein the processor is further configured to execute the stored programmed instructions to:
   receive feedback on an inconsistency on the missing files; and
   update the knowledge database or the predetermined threshold based on the feedback.

7. A method of detecting software application partial commits implemented by one or more software version analysis devices, the method comprising:
   extracting, historical dependency information from a version repository and a bug database for a software application;
   generating a dimensional matrix based on the historical dependency information, wherein the dimensional matrix comprises at least an indication of a set of commits and an indication of a set of files included in each of the commits;
   generating a centrality matrix from the dimensional matrix based on one or more matrix transformations performed on the dimensional matrix;
   obtaining file dependency information of a received another commit associated with the software application, the another commit identifying a plurality of files to be committed;
   determining when the another commit is a partial commit having one or more missing files, which were not included in the plurality of files to be committed, based on one or more matrix transformations performed using the file dependency information and the centrality matrix; and
   determining a set of plausible files for the another commit, generating a ranking of the set of plausible files according to a probability of occurrence in the another commit, determining the missing files based on the ranking or a predetermined threshold, and updating a knowledge database or the predetermined threshold, when the determining indicates that the another commit is a partial commit.

8. The method of claim 7, wherein the dependency information comprises one or more of an indication of one or more transactions performed on the software application, a set of bugs in the software application, or fix information available for the set of bugs.

9. The method of claim 7, wherein the centrality matrix is a right singular matrix and the one or more matrix transformations comprises a singular vector decomposition of the dimensional matrix.

10. The method of claim 7, wherein the file dependency information comprises a vector comprising one or more of an author of the commit, a set of committed files, or a type of modification.

11. The method of claim 7, wherein the missing files are represented as a weighted vector, wherein a weight of each of the missing files in the weighted vector indicates a probability that the missing file should have been included in the plurality of files to be committed of the another commit.

12. The method of claim 7, further comprising:
receiving feedback on an inconsistency on the missing files; and
updating the knowledge database or the predetermined threshold based on the feedback.

13. A non-transitory computer readable medium having stored thereon instructions for detecting software application partial commits comprising machine executable code which when executed by at least one processor, causes the processor to:
extract historical dependency information from a version repository and a bug database for a software application;
generate a dimensional matrix based on the historical dependency information, wherein the dimensional matrix comprises at least an indication of a set of commits and an indication of a set of files included in each of the commits;
generate a centrality matrix from the dimensional matrix based on one or more matrix transformations performed on the dimensional matrix;
obtain file dependency information of a received another commit associated with the software application, the another commit identifying a plurality of files to be committed;
determine when the another commit is a partial commit having one or more missing files, which were not included in the plurality of files to be committed, based on one or more matrix transformations performed using the file dependency information and the centrality matrix; and
determine a set of plausible files for the another commit, generate a ranking of the set of plausible files according to a probability of occurrence in the another commit, determine the missing files based on the ranking or a predetermined threshold, and update a knowledge database or the predetermined threshold, when the determining indicates that the another commit is a partial commit.

14. The non-transitory computer readable medium of claim 13, wherein the dependency information comprises one or more of an indication of one or more transactions performed on the software application, a set of bugs in the software application, or fix information available for the set of bugs.

15. The non-transitory computer readable medium of claim 13, wherein the centrality matrix is a right singular matrix and the one or more matrix transformations comprises a singular vector decomposition of the dimensional matrix.

16. The non-transitory computer readable medium of claim 13, wherein the file dependency information comprises a vector comprising one or more of an author of the commit, a set of committed files, or a type of modification.

17. The non-transitory computer readable medium of claim 13, wherein the missing files are represented as a weighted vector, wherein a weight of each of the missing files in the weighted vector indicates a probability that the missing file should have been included in the plurality of files to be committed of the another commit.

18. The non-transitory computer readable medium of claim 13, wherein the machine executed code when implemented by the processor further causes the processor to:
receive feedback on an inconsistency on the missing files; and
update the knowledge database or the predetermined threshold based on the feedback.

19. The software version analysis device of claim 1, wherein the processor is further configured to execute the stored programmed instructions to:
determine a set of plausible files for the another commit based on the one or more matrix transformations performed using the file dependency information and the centrality matrix;
generate a probability of occurrence in the another commit for each plausible file in the set of plausible files; and
determine the missing files from among the set of plausible files based on the probability.

20. The method of claim 7, further comprising:
determining a set of plausible files for the another commit based on the one or more matrix transformations performed using the file dependency information and the centrality matrix;
generating a probability of occurrence in the another commit for each plausible file in the set of plausible files; and
determining the missing files from among the set of plausible files based on the probability.

21. The non-transitory computer readable medium of claim 13, wherein the machine executed code when implemented by the processor further causes the processor to:
determine a set of plausible files for the another commit based on the one or more matrix transformations performed using the file dependency information and the centrality matrix;
generate a probability of occurrence in the another commit for each plausible file in the set of plausible files; and
determine the missing files from among the set of plausible files based on the probability.

\* \* \* \* \*